United States Patent [19]
Soudijn et al.

[11] 3,882,109
[45] May 6, 1975

[54] [(PHENOTHIAZINYL)PROPYL]-TRIAZASPIRO [4,5]-DECAN-4-ONES

[75] Inventors: Willem Soudijn, Turnhout; Ineke Van Wijngaarden, Beerse; Paul Adriaan Jan Janssen, Vosselaar, all of Belgium

[73] Assignee: Janssen Pharmaceutica N.V., Beerse, Belgium

[22] Filed: Dec. 28, 1973

[21] Appl. No.: 429,432

Related U.S. Application Data

[63] Continuation-in-part of Ser. No. 335,848, Feb. 26, 1973, abandoned.

[52] U.S. Cl. ......... 260/243 A; 424/247; 260/293.66
[51] Int. Cl. ............................................. C07d 93/14
[58] Field of Search .............................. 260/243 A

[56] References Cited
UNITED STATES PATENTS
3,574,204   4/1971   Nakanishi et al. ............... 260/243 A FOREIGN PATENTS OR APPLICATIONS
42-13109   7/1965    Japan ............................ 260/243 A
42-24589   11/1964   Japan ............................ 260/243 A
1,444,403   5/1966   France .......................... 260/243 A
1,444,403   3/1968   France .......................... 260/243 A

*Primary Examiner*—John D. Randolph
*Attorney, Agent, or Firm*—Salvatore R. Conte

[57] ABSTRACT

Compounds of the class of 1-aryl-8-[3-(10-phenothiazinyl)-propyl]-1,3,8-triazaspiro[4,5]decan-4-ones, useful as neuroleptic agents.

6 Claims, No Drawings

[(PHENOTHIAZINYL)PROPYL]-TRIAZASPIRO [4,5]-DECAN-4-ONES

CROSS-REFERENCE TO RELATED APPLICATIONS:

The application is a continuation-in-part of our copending application Ser. No. 335,848, filed Feb. 26, 1973, now abandoned.

DESCRIPTION OF THE INVENTION

This invention relates to a novel class of [(phenothiazinyl)propyl]-triazaspiro[4,5]decan-4-ones, in particular those denoted as 1-aryl-8-[3-(10-phenothiazinyl)-propyl]-1,3,8-triazaspiro [4,5]decan-4-ones, which compounds may be structurally represented by the formula:

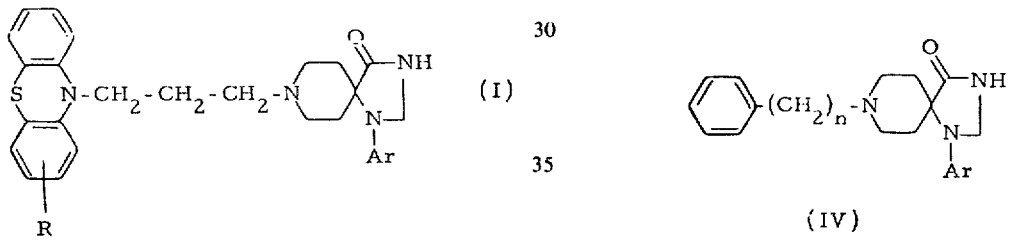

and the therapeutically active non-toxic acid addition salts thereof, wherein R is a member selected from the group consisting of hydrogen, halo and trifluoromethyl; and Ar is a member selected from the group consisting of phenyl and halophenyl, preferably p-fluorophenyl.

As used herein, the term "halo" includes bromo, fluoro, iodo and chloro, the latter being preferred. In the preferred embodiments, said R is in the 2-position of the phenothiazinyl moiety.

The subject compounds (I) are prepared by reacting an appropriate phenothiazine of formula (II), wherein R is as previously defined and X is a reactive ester of the corresponding alcohol, e.g., chloro, bromo, mesylate, tosylate, and the like, preferably chloro or bromo, with 1-aryl-1,3,8-triazaspiro[4,5]-decan-4-ones of formula (III), wherein Ar is as previously defined. This condensation reaction is conveniently conducted in an inert organic solvent such as, for example, an aromatic hydrocarbon, e.g., benzene, toluene, xylene and the like; a lower alkanol, e.g., methanol, ethanol, n-butanol, and the like; a ketone, e.g., 4-methyl-2-pentanone, butanone, and the like; an ether, e.g., dioxane, diethyl ether and the like; dimethylformamide (DMF); nitrobenzene; and the like. The addition of an acid acceptor, i.e., an appropriate base such as, for example, an alkali metal carbonate or bicarbonate, or an organic tertiary amine, such as, for example, a trialkylamine, e.g., triethylamine, tributylamine, and the like, or a heterocyclic amine, e.g., pyridine, quinoline and the like, may be utilized to bind the acid that is liberated during the course of the reaction. The amount of acid acceptor that may be employed is not critical, but, for optimum conditions, the theoretical number of moles of liberated acid can easily be calculated from the quantities of reactants employed and, thus, the corresponding amount of acid acceptor that need be employed can readily be determined. When X is halo, the presence of catalytic amounts of potassium iodide is also desirable. Elevated temperatures may be employed to enhance the rate of reaction.

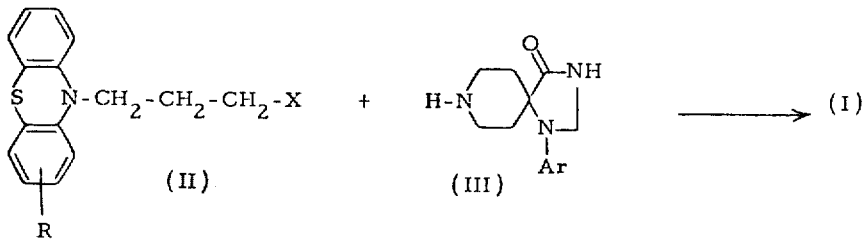

An alternative method for the preparation of compounds of formula (I) consists in the quaternization of compounds of the formula (IV), wherein n is 1 or 2;

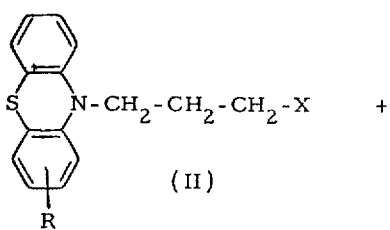

by means of compounds of formula (II) followed by elimination of the protecting group by dequaternization of the quaternary ammonium salt (V) according to methodologies known in the art. When n equals 1, e.g., catalytic debenzylation may be effected; when n equals 2 dequaternization may be carried out, for instance, by treatment of the quaternary ammonium salt with potassium tertiary butylate. The foregoing reaction sequence is illustrated as follows:

N-CH$_2$-CH$_2$-CH$_2$-X + (II)

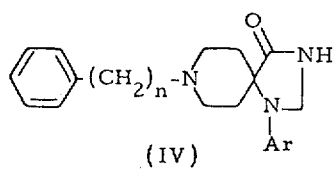

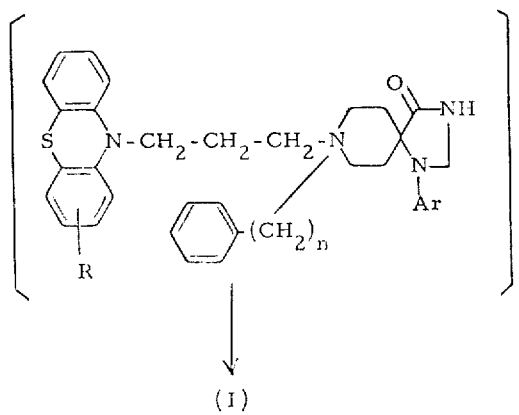

(I)

The subject compounds (I) may be converted to the therapeutically active non-toxic acid addition salt form by treatment with an appropriate acid, such as, for example, an inorganic acid, such as a hydrohalic acid, e.g., hydrochloric, hydrobromic, and the like; and sulfonic acid, nitric acid, phosphoric acid and the like; or an organic acid, such as, for example, acetic, propionic, glycolic, lactic, pyruvic, malonic, succinic, maleic, fumaric, malic, tartaric, citric, benzoic, cinnamic, mandelic, methanesulfonic, ethanesulfonic, benzenesulfonic, p-toluenesulfonic, cyclohexanesulfamic, salicylic, p-aminosalicylic and the like acids. Conversely, the salt form can be converted by treatment with alkali into the free base form.

The compounds of formula (I) and the therapeutically active acid addition salts thereof have been found to possess central nervous system (CNS) depressant activity similar to the neuroleptic activity of butyrophenones, for example, haloperidol (see U.S. Pat. No. 3,438,991) and of certain triazaspiro[4,5]decan-4-ones, e.g., fluspirilene (see U.S. Pat. No. 3,238,216) and of the 4-aryl-4-hydroxypiperidines in U.S. Pat. No. 3,575,990. Although the subject compounds are qualitatively similar in neuroleptic activity to haloperidol, they differ significantly from the latter in their longer duration of action, similar to said fluspirilene and to said 4-aryl-4-hydroxypiperidines.

Neuroleptic drugs are known to block apomorphine-induced vomiting in dogs. In the anti-apomorphine test [see "Method I" in Janssen, P.A.J. et al., Arzneim-Forsch., 15, 1196 (1965)], the compound to be tested is given orally followed at different time intervals thereafter by the standard dose of apomorphine (0.31 mg/kg s.c.) which will induce vomiting in untreated dogs. Anti-apomorphine activity is demonstrated with the compounds (I) and salts thereof at oral dose levels as low as 0.005 mg/kg and at $ED_{50}$—values of about 0.02–1.0 mg/kg orally. The $ED_{50}$—value (in mg/kg) is the oral dose level of the tested compound protecting 50 percent of the animals from emesis. In Table 1, the $ED_{50}$—values and the long duration of activity of the most preferred compounds described herein are given.

Another characterization of neuroleptic drugs is their ability to antagonize amphetamine-induced CNS-stimulation. In the amphetamine antagonism test, male Wistar rats are pretreated with an oral dose of the compound to be tested and challenged one hour thereafter with a standard dose of amphetamine (5 mg/kg i.v.). In untreated animals, the standard dose of amphetamine will induce typical CNS-stimulation, e.g., agitation and stereotyped chewing. These phenomena are antagonized by neuroleptic drugs, and, with the subject compounds, such antagonism is observed at oral dose levels from about 0.05 to about 5.0 mg/kg. The data in Table 1 show the oral dose levels at which the most preferred compounds described herein protect the rats against the amphetamine-induced agitation and chewing.

TABLE 1

| Compound of Example | Anti-apomorphine test in dogs (oral) | | Amphetamine antagonism in rats (oral) |
|---|---|---|---|
| | $ED_{50}$ | Duration | $ED_{50}$ |
| I | 0.035 mg/kg | 60 hours | 2.5 mg/kg |
| II | 0.12 mg/kg | 80 hours | 2.5 mg/kg |
| III | 0.065 mg/kg | 45 hours | 0.63 mg/kg |

It is understood that the compounds in Table 1 are not listed for purposes of limiting the invention thereto, but only to exemplify the useful properties of all the compounds within the scope of formula (I), including the therapeutically active acid addition salts thereof.

The following examples are intended to illustrate, but not to limit, the scope of the present invention. Unless otherwise stated, all parts are by weight.

EXAMPLE I

A mixture of 1.45 parts of 3-(10-phenothiazinyl)-propylchloride, 1.16 parts of 1-phenyl-1,3,8-triazaspiro[4,5]-decan-4-one, 0.8 parts of sodium carbonate, 0.5 parts ot potassium iodide and 7.5 parts of dimethylformamide is stirred for 24 hours at 110°C. The reaction mixture is filtered and the filtrate is diluted with water. The oily product is washed with water and crystallized from acetone. The solid product is filtered off and recrystallized from 2-propanol, yielding, after drying in vacuo at 50°C, 8-[3-(10-phenothiazinyl)propyl]-1-phenyl-1,3,8-triazaspiro[4,5]decan-4-one; m.p. 174.9°C.

EXAMPLE II

A mixture of 1.8 parts of 10-(3-chloropropyl)-2-(α,α,α-trifluoromethyl)phenothiazine, 1.16 parts of 1-phenyl-1,3,8-triazaspiro[4,5]decan-4-one, 0.8 parts of anhydrous sodium carbonate, 0.2 parts of potassium iodide and 7.5 parts of dimethylformamide is stirred and refluxed for 20 hours. The reaction mixture is filtered and diluted with water, whereupon the product is precipitated. It is filtered off and crystallized from ethyl acetate, yielding 1-phenyl-8-{3-[2-(α,α,α-trifluoromethyl)-10-phenothiazinyl]-propyl}-1,3,8-triazaspiro[4,5]decan-4-one; mp. 156.2°C.

EXAMPLE III

A mixture of 1.23 parts of 10-(3-chloropropyl)-2-chlorophenothiazine, 1.16 parts of 1-phenyl-1,3,8-triazaspiro-[4,5]decan-4-one, 0.8 parts of anhydrous sodium carbonate, 0.1 parts of potassium iodide and 7.5 parts of dimethylformamide is stirred while heating in an oil-bath at 105°C for 24 hours. The reaction mixture is cooled, filtered over hyflo and upon dilution with water, the product is crystallized. It is filtered off, washed with water and recrystallized from ethyl acetate. The crude free base, 8-[3-(2-chloro-10-phenothiazinyl)propyl]-1-phenyl-1,3,8-triazaspiro[4,5]decan-4-one, is dissolved in chloroform. The solution is acidified with an excess of 2-propanol previously saturated with gaseous hydrogen chloride. The chloroform is evaporated till crystallization sets in. The salt is allowed to crystallize further while stirring, yielding, after drying in vacuo at 100°C, 8-[3-(2-chloro-10-phenothiazinyl)propyl]-1-phenyl-1,3,8-triazaspiro[4,5]decan-4-one hydrochloride; mp. 201.2°C (dec.).

EXAMPLE IV

A mixture of 1.72 parts of 10-(3-chloropropyl)-2-(trifluoromethyl)-10H-phenothiazine, 1.25 parts of 1-(p-fluorophenyl)-1,3,8-triazaspiro[4,5]decan-4-one, 0.8 parts of sodium carbonate, 0.2 parts of potassium iodide and 7.5 parts of N,N-dimethylformamide is stirred and heated at 95°C for 20 hours. The reaction mixture is cooled, filtered over hyflo and water is added to the filtrate. The product is extracted three times with trichloromethane. The combined extracts are washed thoroughly three times with water, dried, filtered and evaporated. The residue is crystallized twice: first from boiling 2-propanone and then from 2-propanol. The product is filtered off and dried, yielding 1-(4-fluorophenyl)-8-{3-[2-(trifluoromethyl)-10H-phenothiazin-10-yl]propyl}-1,3,8-triazaspiro[4,5]decan-4-one; mp. 168.5°C.

We claim:

1. A chemical compound selected from the group consisting of a [phenothiazinyl)propyl]-1,3,8-triazaspiro[4,5]-decan-4-one having the formula:

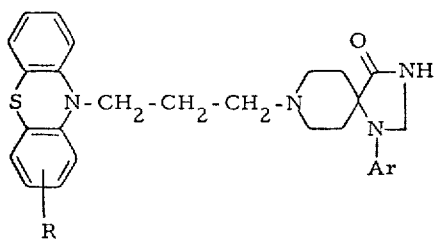

and the therapeutically active acid addition salts thereof, wherein R is a member selected from the group consisting of hydrogen, halo and trifluoromethyl and Ar is a member selected from the group consisting of phenyl and halophenyl.

2. A chemical compound selected from the group consisting of a [(phenothiazinyl)propyl]-1,3,8-triazaspiro[4,5]-decan-4-one having the formula:

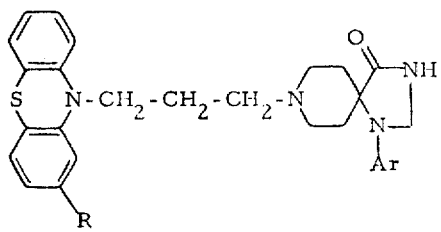

and the therapeutically active acid addition salts thereof, wherein R is a member selected from the group consisting of hydrogen, halo and trifluoromethyl, and Ar is a member selected from the group consisting of phenyl and halophenyl.

3. 8-[3-(10-Phenothiazinyl)propyl]-1-phenyl-1,3,8-triazaspiro[4,5]decan-4-one.

4. 1-Phenyl-8-{3-[2-(α,α,α-trifluoromethyl)-10-phenothiazinyl]propyl}-1,3,8-triazaspiro[4,5]decan-4-one.

5. 8-[3-(2-Chloro-10-phenothiazinyl)propyl]-1-phenyl-1,3,8-triazaspiro[4,5]decan-4-one.

6. 1-(4-Fluorophenyl)-8-{3-[2-(trifluoromethyl)-10H-phenothiazin-10-yl]propyl}-1,3,8-triazaspiro[4,5]decan-4-one.

* * * * *